(12) United States Patent
Noll

(10) Patent No.: US 10,299,435 B2
(45) Date of Patent: May 28, 2019

(54) SELF-STORING HEADER AUGER

(71) Applicant: CNH Industrial America LLC, New Holland, PA (US)

(72) Inventor: Blaine R. Noll, Fleetwood, PA (US)

(73) Assignee: CNH Industrial America LLC, New Holland, PA (US)

( * ) Notice: Subject to any disclaimer, the term of this patent is extended or adjusted under 35 U.S.C. 154(b) by 37 days.

(21) Appl. No.: 15/466,094

(22) Filed: Mar. 22, 2017

(65) Prior Publication Data

US 2018/0271019 A1    Sep. 27, 2018

(51) Int. Cl.
| | |
|---|---|
| *A01D 61/00* | (2006.01) |
| *A01D 34/14* | (2006.01) |
| *A01D 41/127* | (2006.01) |
| *A01D 41/14* | (2006.01) |
| *A01D 45/02* | (2006.01) |

(52) U.S. Cl.
CPC ........... *A01D 61/004* (2013.01); *A01D 34/14* (2013.01); *A01D 41/127* (2013.01); *A01D 41/14* (2013.01); *A01D 45/021* (2013.01)

(58) Field of Classification Search
CPC .. A01D 61/004; A01D 61/006; A01D 61/002; A01D 34/14; A01D 34/8355; A01D 41/127; A01D 19/02; A01D 57/04; A01D 41/00–41/16; A01D 45/021
See application file for complete search history.

(56) References Cited

U.S. PATENT DOCUMENTS

| | | | |
|---|---|---|---|
| 3,474,602 A * | 10/1969 | Molzahn | ................ A01D 43/00 56/14.4 |
| 3,568,863 A | 3/1971 | Mittelbach et al. | |
| 5,673,543 A | 10/1997 | Richardson et al. | |
| 6,775,969 B2 | 8/2004 | Wuebbels et al. | |
| 7,743,591 B2 * | 6/2010 | Meier | ................ A01D 41/1271 56/14.5 |
| 7,971,420 B1 * | 7/2011 | Bollin | .................. A01D 41/145 56/208 |
| 8,166,738 B1 * | 5/2012 | Coers | .................... A01D 61/002 56/181 |
| 9,820,434 B2 * | 11/2017 | McCrea | ................ A01D 34/14 |

(Continued)

FOREIGN PATENT DOCUMENTS

| | | |
|---|---|---|
| EP | 0014854 A1 | 9/1980 |
| EP | 0119659 A2 | 9/1984 |

OTHER PUBLICATIONS

International Search Report and Written Opinion for PCT/US2018/023718, dated Jun. 11, 2018, 11 pages.

*Primary Examiner* — Robert E Pezzuto
*Assistant Examiner* — Adam J Behrens
(74) *Attorney, Agent, or Firm* — Peter K. Zacharias; Patrick M. Sheldrake

(57) ABSTRACT

An agricultural vehicle including a chassis, a feeder housing supported by the chassis, and an attachment. The attachment includes a header coupled to the feeder housing. The header has a top support beam and a pair of lateral ends. The attachment also includes an auger that has an axis of rotation and is configured to rotate about the axis of rotation. The auger is pivotally connected to the header and is pivotable about a pivot axis. The auger is selectively pivotable between a stored position and an operating position such that in the stored position the auger does not obstruct a line of sight of an operator.

28 Claims, 3 Drawing Sheets

(56) References Cited

U.S. PATENT DOCUMENTS

2002/0174636 A1 11/2002 Calmer
2007/0204588 A1* 9/2007 Neece .................. A01D 45/021
56/119

* cited by examiner

SELF-STORING HEADER AUGER

FIELD OF THE INVENTION

The present invention relates to agricultural vehicles, and, more particularly, to agricultural vehicles which include an auger mounted on a header for harvesting bushy or fluffy crop material.

BACKGROUND OF THE INVENTION

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves and is transported to a grain pan. From the grain pan the grain is cleaned using a cleaning system, and is then transported to a grain tank onboard the combine. The cleaning system includes a cleaning fan which blows air through oscillating sieves to discharge chaff and other debris toward the rear of the combine. Non-grain crop material such as straw from the threshing section proceeds through a straw chopper and out the rear of the combine. When the grain tank becomes full, the combine is positioned adjacent a vehicle into which the grain is to be unloaded, and an unloading system, e.g., an unloading auger, on the combine is actuated to transfer the grain into the vehicle.

A typical header includes one or more cutters, e.g., cutter bars with reciprocating knives, which cut the crop material that is harvested from the field. Once the crop material is cut, a conveyor system, which is positioned rearwardly of the cutter(s), transports the crop material to the feeder housing. Modern headers generally have cutters and attachments which are specifically optimized to harvest a particular kind of crop material. For example, the header may include a rotating reel with tines or the like to sweep the crop material towards the cutter(s). Additionally, the header may include an auxiliary cross auger that is positioned rearwardly of the rotating reel and above the conveyor system in order to help facilitate transportation of the crop material to the feeder housing.

In regards to bushy or fluffy crop material, such as straight-cut canola, lentils, mustard, or peas, the auxiliary cross auger considerably enhances the transportation of the crop material to the feeder housing. Bushy or fluffy crop material generally does not have the necessary weight to expeditiously move along the belt of the conveyor system. Also, because bushy or fluffy crop material is rather voluminous, it can quickly amass at the lateral ends of the header, thereby clogging the conveyor system and decreasing the flow of crop material to the feeder housing. The cross auger keeps the conveyor system from becoming clogged as it restricts further vertical accumulation and laterally moves the bushy or fluffy crop material towards the center of the header.

Although the cross auger is tremendously beneficial in harvesting bushy or fluffy crop material, it may nevertheless cause various operational issues and inefficiencies. The cross auger may not be necessary in harvesting various other types of crop material and thereby its use may be superfluous or even counterproductive. Under circumstances when the cross auger is not needed, it is known for an operator to place the cross auger in a storage position or leave the cross auger in the operating position. Generally, the cross auger is moved upward to a storage position that is up and out of the way of the header so as to not impede crop flow. However, the stored position of the cross auger can obstruct the operator's line of sight. Additionally, the process of moving the cross auger can be cumbersome. If the operator chooses to leave the cross auger in the operating position, the cross auger may continue to run which elevates the oil temperature of the system. Leaving the cross auger running in the operating position may cause inefficiencies, reduced operational life of the auger, or other machine issues.

What is needed in the art is an agricultural harvester with an auxiliary auger that can be easily and selectively moved between operating and non-operating positions.

SUMMARY OF THE INVENTION

In accordance with an aspect of the present invention, there is provided an agricultural vehicle with a header and an auger capable of being rotated between an operating and a stored position such that when stored the auger does not interfere with an operator's line of sight.

In accordance with another aspect of the present invention, an agricultural vehicle includes a chassis, a feeder housing supported by the chassis, and an attachment. The attachment includes a header coupled to the feeder housing. The header has a top support beam and a pair of lateral ends. The attachment also includes an auger that has an axis of rotation and is configured to rotate about the axis of rotation. The auger is pivotally connected to the header and is pivotable about a pivot axis. The auger is selectively pivotable between a stored position and an operating position such that in the stored position the auger does not obstruct a line of sight of an operator.

In accordance with yet another aspect of the present invention, an attachment includes a header that has a top support beam and a pair of lateral ends and an auger. The auger has an axis of rotation and is configured to rotate about the axis of rotation. The auger is pivotally connected to the header and is pivotable about a pivot axis. The auger is selectively pivotable between a stored position and an operating position such that in the stored position the auger does not obstruct a line of sight of an operator.

An advantage of the agricultural harvester described herein is that the auger may be stored in a position which does not obstruct crop flow or the operator's line of sight.

Another advantage of the agricultural harvester described herein is that an operator may easily switch from harvesting one crop material to another crop material by simply changing the auger to be in either an operating or stored position.

Still another advantage of the agricultural harvester described herein is that it reduces inefficiencies of the system and increases the operational life of the auger.

BRIEF DESCRIPTION OF THE DRAWINGS

The above-mentioned and other features and advantages of this invention, and the manner of attaining them, will become more apparent and the invention will be better understood by reference to the following descriptions of exemplary embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
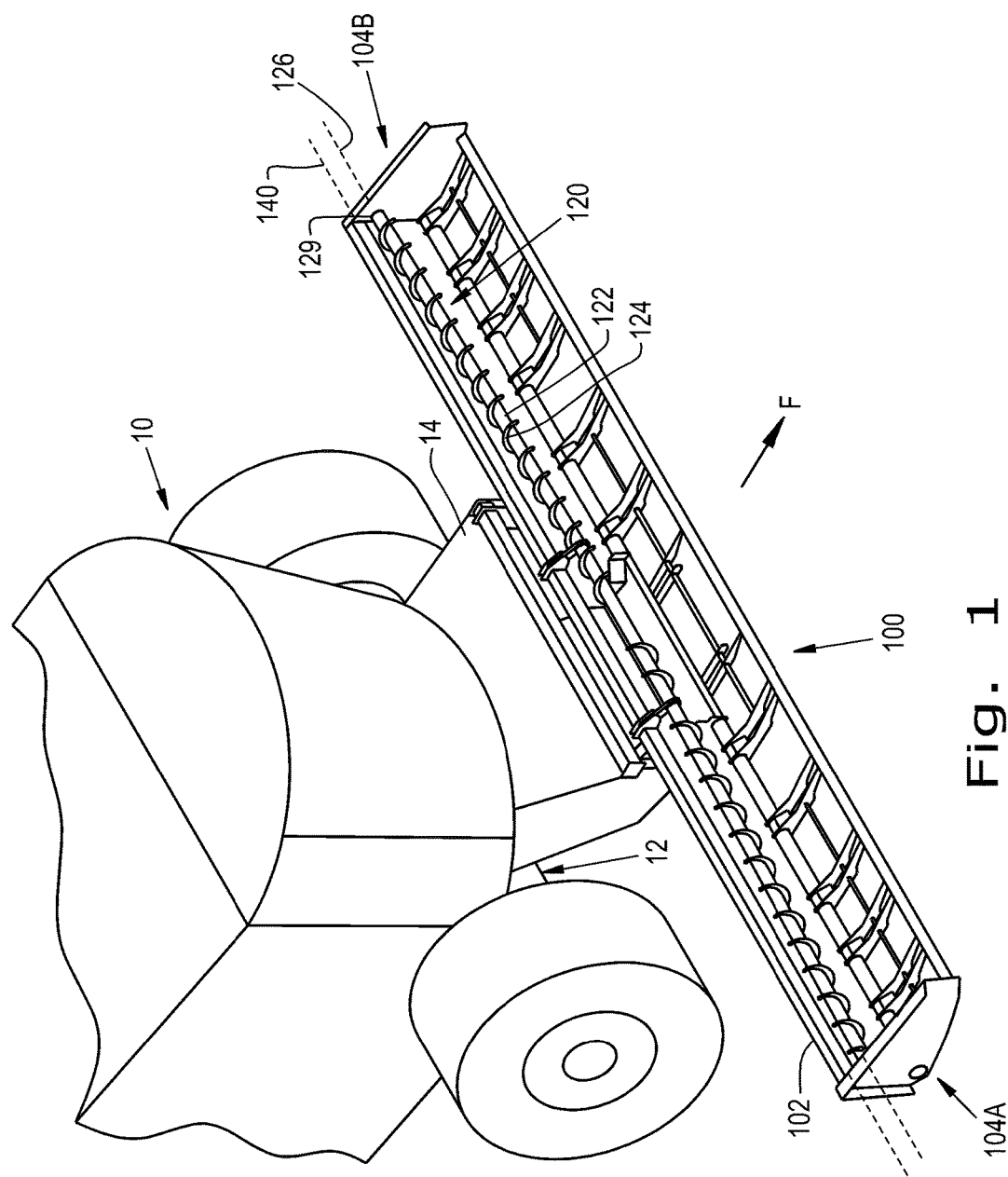
FIG. 1 is a perspective view of an agricultural vehicle with a header and auger in accordance with an exemplary embodiment of the present invention.

Referring now to the drawings, and more particularly to FIG. 1, there is shown an exemplary embodiment of an agricultural vehicle 10 in the form of a combine harvester which generally includes a chassis 12, a feeder housing 14, and an attachment in the form of a header 100 with an auger 120 that can move to be in an operating or stored position. Typically, the combine harvester 10 will include additional internal systems for the separation and handling of collected crop material, but these additional systems are omitted from view for brevity of description. It should be appreciated that the auger described and illustrated herein does not necessarily need to be included on combine harvesters, but can be incorporated in other agricultural vehicles such as windrowers.

The header 100 is coupled to the feeder housing 14 and supported by the chassis 12 of the agricultural vehicle 10. The header 100 has a top support beam 102 extending transversely across the length of the header 100 and a pair of opposed lateral ends 104A, 104B. In the exemplary embodiment shown, the header 100 is in the form of a draper header to harvest bushy or fluffy crop material. The header 100 may include draper belts to transport crop material to the feeder housing 14. However, the header 100 may be in the form of a conventional header without the accompanying draper belts of the draper header. The header 100 may also include a rotating reel with tines or the like to sweep the crop material inwardly. The header 100 may support one or more cutter bars to cut crop material as the agricultural vehicle 10 travels in a forward direction, denoted by arrow F. It is conceivable however for the header 100 to be in the form of a corn header which includes snouts and row units instead of cutter bars.

The auger 120 includes an axle 122 that has flighting 124 and an axis of rotation 126 in which the auger 120 rotates about when engaging the crop material. The auger 120 may also be pivotally coupled to the header 100 such that it can pivot about a pivot axis 140 between operating and stored positions. The pivot axis 140 may be located beneath and substantially parallel to the top support beam 102 of the header 100. Alternatively, the pivot axis 140 may be located at any other desired location relative to the top support beam 102 including, for example, above the top support beam 102 and/or in front of or behind the top support beam 102 (not shown). The flighting 124 of the auger 120 may include left and right flighting, and the flighting 124 may be configured to not extend across the center of the header 100. The auger 120 may be rotationally driven about its axis of rotation 126 by incorporating known drivelines.

Figure 2:
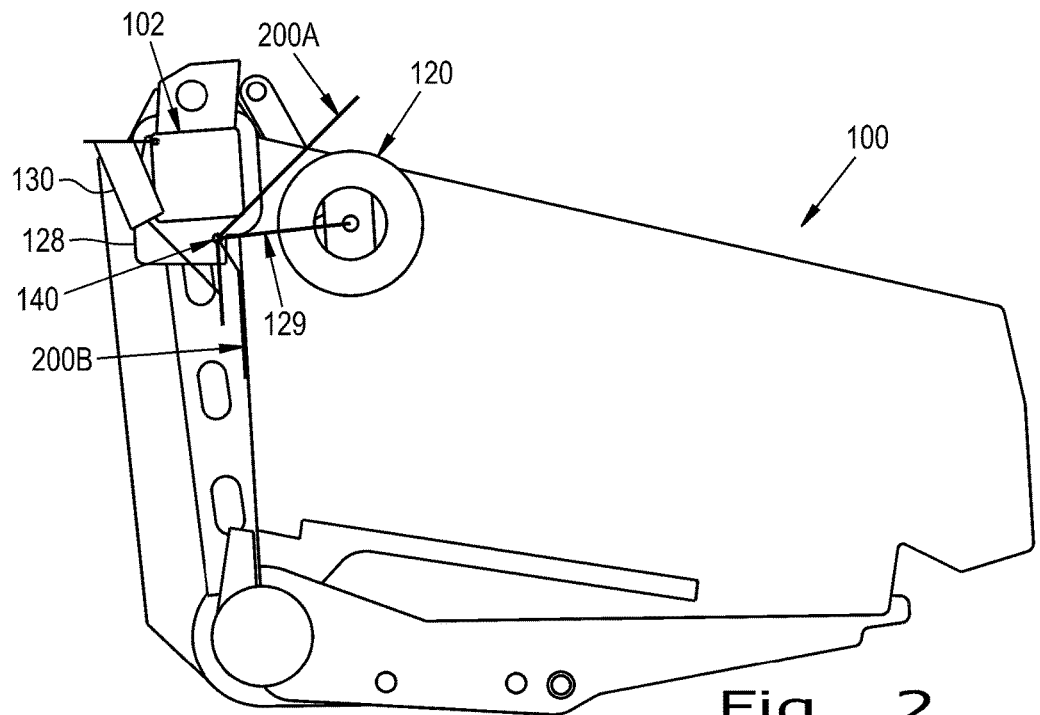
FIG. 2 is a side view of the auger in an operating position in accordance with the exemplary embodiment of the present invention as shown in FIG. 1.
Figure 3:
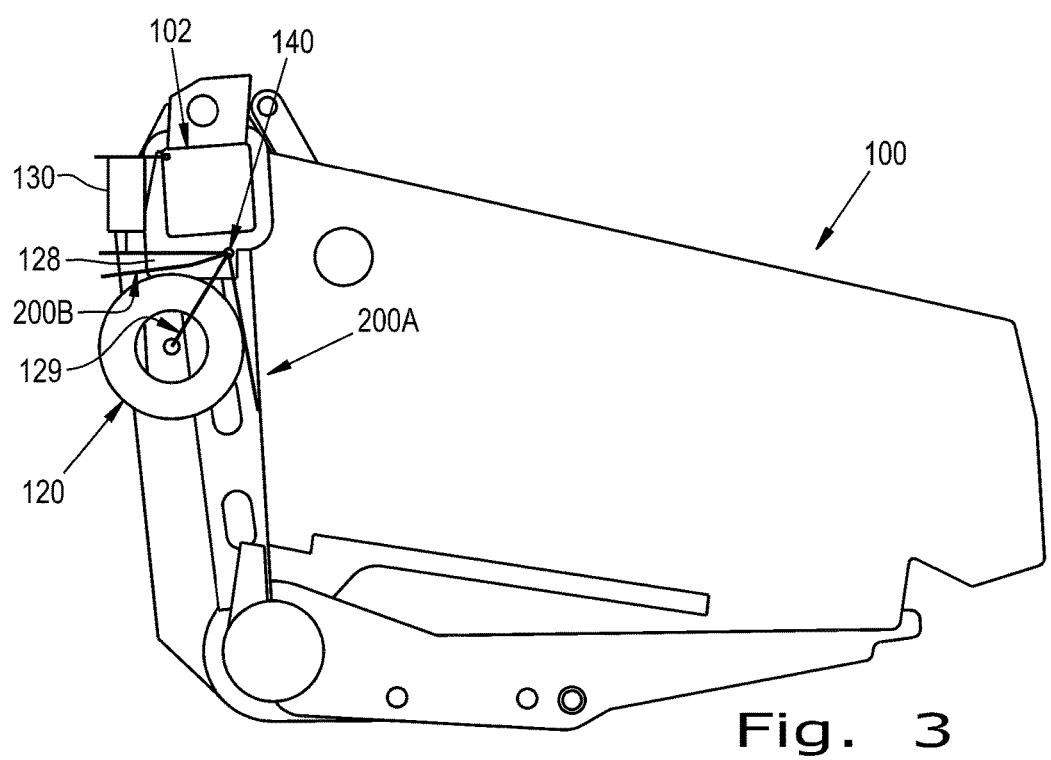
FIG. 3 is a side view of the auger in a stored position in accordance with the exemplary embodiment of the present invention as shown in FIG. 1.

Referring now to FIGS. 2 and 3, there is shown the auger 120 in an operating position (FIG. 2) and a stored position (FIG. 3). The auger 120 is pivotally connected to the header 100 by a pair of support brackets 128 and a pair of support arms 129 that are located adjacent to each lateral end 104A, 104B of the header 100. Additionally, there may be more than two support brackets 128 and/or more than two support arms 129. As shown, the support brackets 128 are attached to the underside of the top support beam 102 of the header 100; however, the support brackets 128 may be attached at any desired position, for example at the topside of the top support beam 102. The support brackets 128 may be attached to the top support beam 102 by fasteners or any other known means. The support arms 129 rotationally connect the auger 120 at one end and pivotally connect the support brackets 128 at the other end. The connection point of the support brackets 128 and support arms 129 defines the pivot axis 140. In this regard, the auger 120 selectively pivots between the stored position and the operating position via the support arms 129 rotating about the pivot axis 140.

The auger 120 may be pivoted by one or more actuators 130 that can be affixed to mounts that are coupled to the header 100 at one or both of the lateral ends 104A, 104B and/or at the center of the header 100. In the exemplary embodiment of the present invention, there are two or more actuators 130 in the form of cylinders that extend and retract the auger 120. However, the actuator(s) 130 may be in the form of a rotary actuator either mounted directly onto the pivot axis 140 or offset from the pivot axis 140 with accompanying drive chains or belts to pivot the auger 120. The actuator(s) 130 may be electrically or hydraulically powered.

In the operating position, the auger 120 is engageable with the crop material and it is positioned in front of the top support beam 102 of the header 100. In the stored position, the auger 120 is positioned under the top support beam 102 of the header 100 and it does not obstruct a line of sight of an operator. When stored, the auger 120 is shown to fit within a designated void or compartment between the top support beam 102 and the floor (e.g., the lateral draper deck) of the housing 100. Further, the auger 120 fits within a receiving slot that is cut out of the backwall of the header 100. Thereby, the auger 120 at least partially extends beyond the backwall of the header 100, which allows for more available space for the crop material to flow when the auger 120 is not in use. However, the auger 120 may rest beneath the top support beam 102 and against the backwall of the header 100 without being disposed in a designated slot or compartment (not shown).

The auger 120 may also include a top back sheet 200A and a bottom back sheet 200B, which are both pivotally connected to the header 100. The back sheets 200A, 200B can collectively pivot together at the same time with the auger 120 about the pivot axis 140. The back sheets 200A, 200B respectively extend in front of (i.e. above) and behind (i.e. below) the auger 120. The back sheets 200A, 200B may be in the form of hinged flaps comprised of metal, plastic or a composite material. In the exemplary embodiment of the present invention, the back sheets 200A, 200B are rigid; however, they may be deformable and flex with the weight of the crop material. The top back sheet 200A is shown to be straight and the bottom back sheet 200B is shown to be bent; however, either of the back sheets 200A, 200B may be straight, bent, or curved, or they be made of multi-part sections with any combination of straight, bent, or curved subsections.

The back sheets 200A, 200B act to shield the auger 120 and facilitate transportation of the crop material. In the stored position, when the auger 120 fills the void below the top support beam 102 and above the floor of the header 100, the bottom back sheet 200B points rearwardly and does not obstruct crop flow or the operator's line of sight. The top back sheet 200A substantially covers the auger 120 from engaging with the crop material, thereby at least partially covering the space between the top support beam 102 and the floor of the header 100. In this manner, the crop material is blocked from becoming lodged in the auger 120 when it is in the stored position. In the operating position, the bottom back sheet 200B at least partially covers the space between the top support beam 102 and the floor of the header 100, and the top back sheet 200A points slightly upward and forward but it does not extend far enough to block the operator's line of sight.

Figure 4:
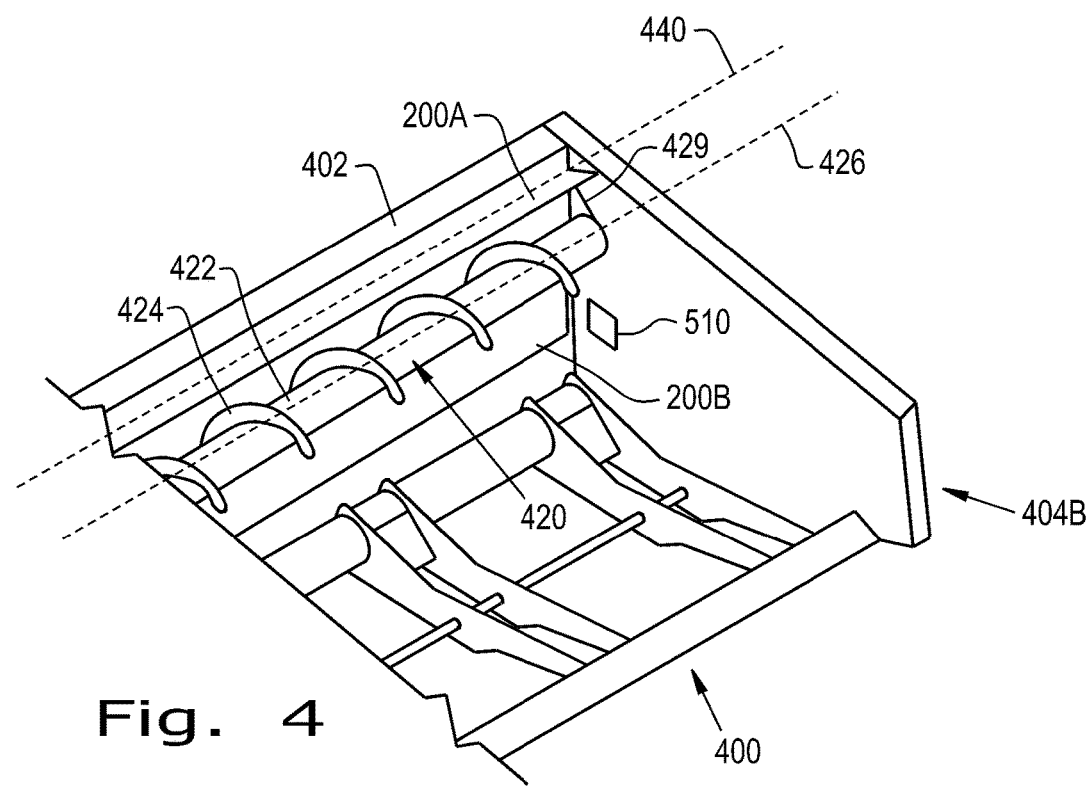
FIG. 4 is a perspective view of an end of a header in accordance with another exemplary embodiment of the present invention.
Figure 5:
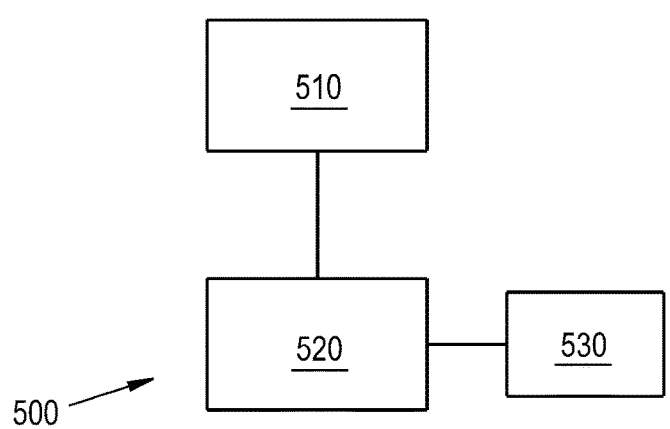
FIG. 5 is a diagram of a control circuit in accordance with the exemplary embodiment of the present invention as shown in FIG. 4.

Referring now to FIGS. 4-5, there is shown a header 400 with a control circuit 500 that can automatically store and activate an auger 420 based upon a sensor reading in accordance with another exemplary embodiment of the present invention. The header 400 generally includes a top support beam 402, a pair of lateral ends of which only end 404B is shown, the auger 420, and the control circuit 500. In the exemplary embodiment shown, the header 400 is in the form of a draper header to harvest bushy or fluffy crop material. The header 400 may include a rotating reel with tines, a conveyor (e.g. draper belts), and/or cutter bars to cut crop material. It is conceivable however for the header 400 to be in the form of a corn header which includes snouts and row units instead of cutter bars.

As discussed above with respect to the aforementioned embodiment, the auger 420 has an axle 422, flighting 424, and an axis of rotation 426. The auger 420 may also be pivotable between an operating and stored position about a pivot axis 440 via one or more actuators 530 (FIG. 5). The auger 420 may also include top and bottom back sheets 200A, 200B for facilitating the transportation of the crop material, which both can be moved in conjunction with the auger 420 by the actuator(s) 530. Further, as in the aforementioned embodiment, the header 400 may also include a pair of support brackets and support arms 429 for attaching the auger 420 to the header 400.

The control circuit 500 includes a sensor 510 and a controller 520, which controls the motion of the one or more actuators 530. For example, when the crop material reaches a predetermined threshold level upon building up within the header 400, the sensor 510 sends a signal to the controller 520 which activates the actuator(s) 530 to pivot the auger 420 in the operating position. Additionally, when the crop material subsides to a certain level and/or remains beneath the threshold value for a predetermined amount of time, the sensor 510 sends another signal to the controller 520 which activates the actuator(s) 530 to store the auger 420. In this regard, the header 400 automatically engages or self-stores the auger 420 with minimal to no oversight by a user.

The sensor 510 may be located adjacent to one of the lateral ends of the header 400, e.g. 404B as shown in FIG. 4. Alternatively, the sensor 510 may be affixed to the backwall of the header or located at any other position on the header 400 where it can accurately read a certain level of the crop material within the header 400. The sensor 510 may in the form of an optical sensor that is known in the art. The header 400 may include one or multiple sensors 510 located at each lateral end of the header 400 and/or dispersed along the width of the header 400. The sensor 510 may be electrically coupled to or communicate wirelessly with the controller 520.

The controller 520 may be located on the header 400 itself or within an agricultural vehicle. The controller 520 may be in the form of a CPU or processor such that it can receive signals from the sensor 510 and automatically control a position of the auger 420 to place or keep the auger 420 in the operating or stored position. The controller 520 may communicate wirelessly or it may be electrically coupled to the sensor 510 and actuator(s) 530.

The actuator(s) 530 may be located at one or both of the lateral ends and/or at the center of the header 400. In the exemplary embodiment of the present invention, there are two actuators 530 at each lateral end of the header 400 which are in the form of cylinders that extend and retract the auger 420. However, there may be more than two actuators 530 and the actuator(s) 530 may be in the form of a rotary actuator either mounted directly onto the pivot axis 440 or offset from the pivot axis 440 with accompanying drive chains or belts to pivot the auger 420.

In regards to the aforementioned embodiments, it is conceivable to manually adjust the position of the auger 120 or 420 through a mechanical link instead of the actuator(s) 130 or 530. Additionally, the auger 120 or 420 may be positioned by the actuator(s) 130 or 530 without the use of a sensor to sense the crop material in the header 100 or 400.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural vehicle, comprising:
   a chassis;
   a feeder housing supported by the chassis; and
   an attachment, including:
      a header coupled to the feeder housing, the header having a top support beam and a pair of lateral ends; and
      an auger having an axis of rotation and configured to rotate about the axis of rotation, the auger pivotally connected to the header and pivotable about a pivot axis, the auger being selectively pivotable between a stored position and an operating position, wherein the axis of rotation of the auger when the auger is in the operating position is above the axis of rotation of the auger when the auger is in the stored position.

2. The agricultural vehicle according to claim 1, wherein in the stored position the auger is positioned under the top support beam of the header and in the operating position the auger is in front of the top support beam and is engageable with a bushy or fluffy crop material.

3. The agricultural vehicle according to claim 1, wherein the pivot axis is substantially parallel to the top support beam of the header.

4. The agricultural vehicle according to claim 1, wherein the attachment further includes a first and a second back sheet pivotally connected to the header and pivotable about the pivot axis, the first back sheet extending at least partially in front of the auger and the second back sheet extending at least partially behind the auger.

5. The agricultural vehicle according to claim 4, wherein in the stored position the first back sheet substantially covers the auger from being engageable with a crop material, and in the operating position the first back sheet does not block a line of sight of an operator.

6. The agricultural vehicle according to claim 4, wherein in the stored position the second back sheet does not block a line of sight of an operator, and in the operating position the second back sheet at least partially covers a space between the top support beam and a floor of the header.

7. The agricultural vehicle according to claim 4, wherein the first back sheet and second back sheet collectively pivot together at a same time with the auger.

8. The agricultural vehicle according to claim 1, wherein the attachment further includes a pair of support brackets attached to the top support beam and positioned adjacent to each lateral end of the header.

9. The agricultural vehicle according to claim 8, wherein the attachment further includes a pair of support arms pivotally connecting the auger respectively to the pair of support brackets.

10. The agricultural vehicle according to claim 1, wherein the header further has a control circuit having a controller and at least one sensor, the controller receiving a signal from the at least one sensor and automatically controlling a position of the auger.

11. An attachment, comprising:
a header including a top support beam and a pair of lateral ends; and
an auger including an axis of rotation and configured to rotate about the axis of rotation, the auger pivotally connected to the header and pivotable about a pivot axis, the auger being selectively pivotable between a stored position and an operating position, wherein the axis of rotation of the auger when the auger is in the operating position is above the axis of rotation of the auger when the auger is in the stored position.

12. The attachment according to claim 11, wherein in the stored position the auger is positioned under the top support beam of the header and in the operating position the auger is in front of the top support beam and is engageable with a bushy or fluffy crop material.

13. The attachment according to claim 11, wherein the pivot axis is substantially parallel to the top support beam of the header.

14. The attachment according to claim 11, further comprising a first and a second back sheet pivotally connected to the header and pivotable about the pivot axis, the first back sheet extending at least partially in front of the auger and the second back sheet extending at least partially behind the auger.

15. The attachment according to claim 14, wherein in the stored position the first back sheet substantially covers the auger from being engageable with a crop material, and in the operating position the first back sheet does not block a line of sight of an operator.

16. The attachment according to claim 14, wherein in the stored position the second back sheet does not block a line of sight of an operator, and in the operating position the second back sheet at least partially covers a space between the top support beam and a floor of the header.

17. The attachment according to claim 14, wherein the first back sheet and second back sheet collectively pivot together at a same time with the auger.

18. The attachment according to claim 11, further comprising a pair of support brackets attached to the top support beam and positioned adjacent to each lateral end of the header.

19. The attachment according to claim 18, further comprising a pair of support arms pivotally connecting the auger respectively to the pair of support brackets.

20. The attachment according to claim 11, wherein the header further includes a control circuit with a controller and at least one sensor, the controller receiving a signal from the at least one sensor and automatically controlling a position of the auger.

21. A header comprising:
a top support beam;
a pair of lateral ends; and
an auger having an axis of rotation and configured to rotate about the axis of rotation, the auger pivotable about a pivot axis, the auger being selectively pivotable between a stored position and an operating position, wherein the axis of rotation of the auger when the auger is in the operating position is above the axis of rotation of the auger when the auger is in the stored position.

22. The header according to claim 21, wherein in the stored position the auger is positioned under the top support beam, and in the operating position the auger is in front of the top support beam.

23. The header according to claim 21, wherein the pivot axis is substantially parallel to the top support beam.

24. The header according to claim 21, further comprising a first back sheet and a second back sheet pivotable about the pivot axis, the first back sheet extending at least partially in front of the auger and the second back sheet extending at least partially behind the auger.

25. The header according to claim 24, wherein in the stored position the first back sheet substantially covers the auger from being engageable with a crop material.

26. The header according to claim 24, further comprising a floor, wherein in the operating position the second back sheet at least partially covers a space between the top support beam and the floor.

27. The header according to claim 24, wherein the first back sheet and second back sheet collectively pivot together at a same time with the auger.

28. The header according to claim 21, further comprising a control circuit including a controller and at least one sensor, the controller configured for receiving a signal from the at least one sensor and automatically controlling a position of the auger.

* * * * *